Nov. 4, 1958 W. F. TRAUGOTT 2,859,058
ADJUSTABLE PIVOTAL MOUNTING
Filed Nov. 8, 1957
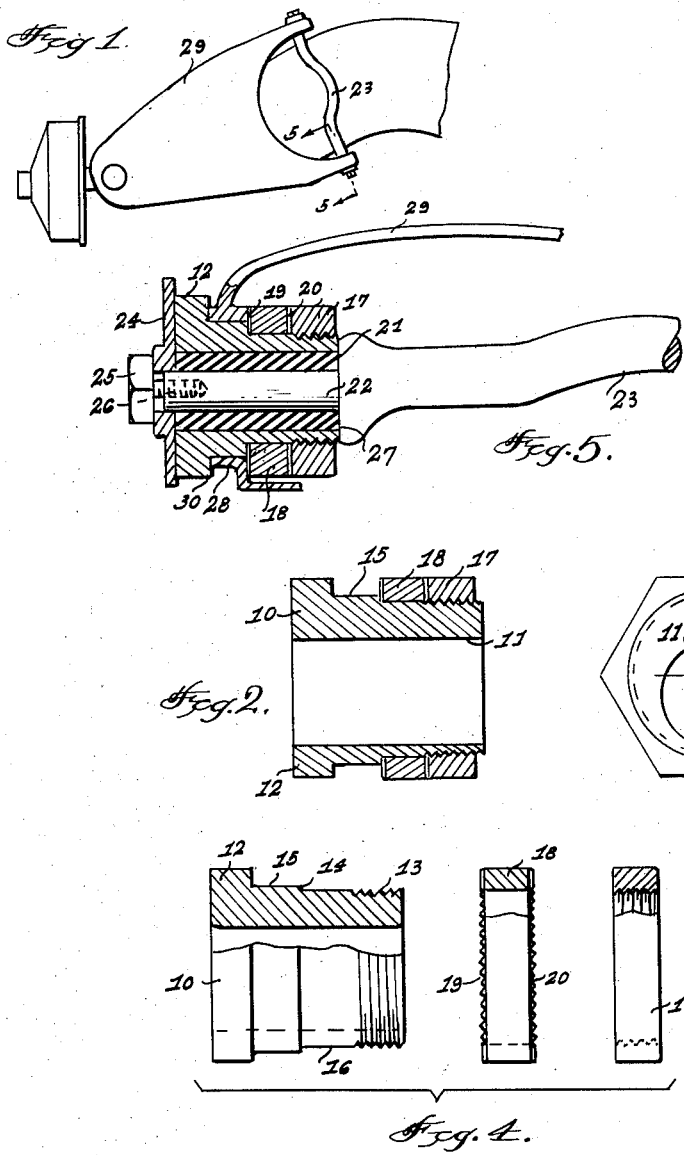
INVENTOR.
WILFRED F. TRAUGOTT
BY
ATTORNEYS

United States Patent Office 2,859,058
Patented Nov. 4, 1958

2,859,058

ADJUSTABLE PIVOTAL MOUNTING

Wilfred F. Traugott, West Point, Va.

Application November 8, 1957, Serial No. 695,339

5 Claims. (Cl. 287—53)

This invention relates to connections between moving parts of machinery and equipment particularly as used for connecting idler arms for motor vehicle steering assemblies to brackets, and in particular an elongated bushing having an eccentrically positioned bore extended longitudinally therethrough with a head having flat sides positioned on and integral with one end of the bushing and also with a nut threaded on the opposite end and positioned to clamp a collar having serrated side surfaces against the hub of an arm or other device.

The purpose of this invention is to provide means for obtaining accurate adjustment in connections between moving parts of machinery and equipment.

Various types of shims and other take up devices have been used in pivotal connections between parts of machinery and equipment and wear and play in such connections has been taken up by changing bushings therein, however, in numerous instances it has been found necessary to take up wear or play in connections where new parts are not available and where it is impractical to rebore or turn down parts for such connections. With this thought in mind this invention contemplates a pivotal connection between moving parts or between a stationary part and a moving part wherein one of the parts is mounted in an eccentrically positioned opening or bore extended through a bushing in another part so that by turning the bushing, and securing the same in position with lock nuts the distance between centers of the parts may be infinitely adjusted.

The object of this invention is, therefore, to provide an adjustable pivotal mounting wherein distances between centers of connecting elements is adjustable by turning a bushing in one of the elements.

Another object of the invention is to provide an adjustable pivotal mounting in which a bushing extended through one part of the mounting is provided with an eccentrically positioned bore so that by rotating the bushing the distance between the centers or parts connected by the device is adjustable.

Another important object of the invention is to provide an adjustable pivotal mounting wherein a bushing having an eccentrically positioned bore extends through a hub or other part of one of the elements in which resiliency is provided in the connection by a rubber sleeve extended through the eccentrically positioned bore.

A further object of the invention is to provide a bushing having an eccentric bore for use in pivotal mountings in which the bushing is designed to be installed in connections of parts of machinery and equipment now in use.

A still further object of the invention is to provide an adjustable pivotal mounting for connecting parts of machinery and equipment in which the mounting is of simple and economical construction.

With these and other objects and advantages in view the invention embodies a cylindrical body having a head with flat sides on one end, threads on the opposite end and a shoulder positioned between the threads and head, the body having an eccentrically positioned bore extended longitudinally therethrough, a collar having serrated side surfaces mounted on the bushing and positioned against the shoulder, a sleeve of resilient material extended through the bore of the bushing and a nut threaded on the threaded end of the bushing.

Other features and advantages of the invention will appear from the following description taken in connection with the drawing, wherein:

Figure 1 is a side elevational view illustrating a connection between an idler arm and a wheel mounting of a vehicle showing, in particular, a brake drum of the mounting.

Figure 2 is a longitudinal section through the bushing with the associated parts thereon and with other parts omitted, the section being taken on line 2—2 of Figure 3.

Figure 3 is an end elevational view of the bushing looking toward the end on which the nut is threaded.

Figure 4 is an exploded view illustrating the bushing, the collar having serrated side surfaces and nut with portions of the parts broken away showing sections through upper parts thereof.

Figure 5 is a longitudinal section through the assembly showing a pin extended through the eccentrically positioned bore of the bushing and illustrating a connection between an idler arm and a bracket of a motor vehicle.

Referring now to the drawing wherein like reference characters denote corresponding parts the improved pivotal mounting of this invention includes a bushing 10 having a bore 11 extended longitudinally therethrough with a head 12 having flat sides, such as being of hexagonal shape, on one end, with threads 13 on the opposite end with a shoulder 14 positioned between the threads and head providing cylindrical surfaces 15 and 16, a nut 17 threaded on the threads 13, a collar 18 having serrated side surfaces 19 and 20 positioned on the cylindrical surface 16 and a sleeve 21 of rubber or other resilient material extended through the bore 11 and positioned over a pin 22 of a member, such as an idler arm bracket 23.

In the design shown the connection is mounted in a bracket 24 with the head 12 against one face thereof and with the parts retained in assembled relation by a screw 25 which is threaded into an opening 26 in the end of the pin 22 whereby with a shoulder 27 of the idler arm 23 drawn against the threaded end of the bushing the bushing is clamped between the shoulder 27 and bracket 24 and the position of the idler arm bracket in relation to the bracket 24 is readily adjusted by turning the bushing on the rubber sleeve or pin.

A hub 28 of a clevis or other fastener 29 is clamped between the collar 18 and inner surface 30 of the head 12 of the bushing and it will be understood that the bushing may be used in various types of connections or between parts of different machinery and equipment.

In adjusting the parts it is only necessary to loosen the nut 17 with a wrench, or the like and by placing a wrench on the head 12, turning the bushing wherein the center 31 of the bore 11 therein turns about the center 32 or the pin 22 or other part of the assembly.

It will be understood that modifications, within the scope of the appended claims, may be made in the design and arrangement of the parts without departing from the spirit of the invention.

What is claimed is:

1. A bushing comprising a cylindrical body having a bore extended longitudinally therethrough and eccentrically positioned therein, the bushing having a head with flat side surfaces thereon at one end a shoulder spaced from the head and the opposite end of the body being threaded, a sleeve of resilient material extended through the body, a collar having rough side surfaces positioned on the bushing, and a nut on the threaded end of the bushing for clamping the collar against the shoulder spaced from the head of the bushing.

2. A bushing comprising a cylindrical body having a bore extended longitudinally therethrough, the bore being eccentrically positioned therein, the bushing having a head with flat side surfaces thereon at one end, threads on the outer surface of the opposite end and a shoulder between the threads and head providing cylindrical surfaces between the shoulder and head and also between the shoulder and threads.

3. An adjustable pivotal mounting comprising a bushing having a cylindrical body with a bore extended longitudinally therethrough and eccentrically positioned therein, the body having a head on one end, threads on the outer surface, and a shoulder positioned between the threads and head, a sleeve of resilient material extended through the bore, a collar having serrated side surfaces positioned on the bushing between the threads and shoulder, and a nut threaded on the threaded end of the bushing.

4. In an adjustable pivotal mounting assembly, the combination which comprises an elongated cylindrical body having a bore extended longitudinally therethrough and eccentrically positioned therein, a head with flat side surfaces thereon integral with and extended from one end, threads on the outer surface and a shoulder between the threads and head providing cylindrical surfaces between the shoulder and head and also between the shoulder and threads, a collar having serrated side surfaces positioned on the bushing, and a lock nut threaded on the threaded end of the bushing.

5. In a bushing, the combination which comprises a cylindrical body having a bore extended longitudinally therethrough, the bore being eccentrically positioned in the bushing, a lining of resilient material positioned in the bore of the bushing, a head having flat sides integral with and extended from one end of the bushing, the opposite end of the bushing being threaded and intermediate part of the bushing being provided with a shoulder, forming a cylindrical portion between the shoulder and head and also a cylindrical portion, the diameter of which is less than that of the former cylindrical portion, between the shoulder and threads, a collar having serrated side surfaces positioned on the cylindrical surface between the shoulder and threads, and a nut positioned on the threaded end of the bushing.

References Cited in the file of this patent
UNITED STATES PATENTS
2,380,867   Packer _____ July 31, 1945